(12) United States Patent
Kannan et al.

(10) Patent No.: US 8,788,926 B1
(45) Date of Patent: Jul. 22, 2014

(54) METHOD OF CONTENT FILTERING TO REDUCE INK CONSUMPTION ON PRINTED WEB PAGES

(75) Inventors: Akshay Kannan, Fremont, CA (US); Yuri G. Dolgov, Mountain View, CA (US); Yevgeniy Gutnik, Cupertino, CA (US); Tyler Odean, San Francisco, CA (US); Marc Pawliger, San Jose, CA (US); Maxim Alexandrovich Kolosovskiy, Barnaul (RU)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/362,601

(22) Filed: Jan. 31, 2012

(51) Int. Cl.
*G06F 17/22* (2006.01)
*G06F 17/24* (2006.01)

(52) U.S. Cl.
USPC .......................................... 715/205; 715/274

(58) Field of Classification Search
USPC ........................................................ 715/205
See application file for complete search history.

(56) References Cited

U.S. PATENT DOCUMENTS

| | | | |
|---|---|---|---|
| 7,225,103 B2 * | 5/2007 | Beresniewicz et al. | 702/179 |
| 8,325,365 B2 * | 12/2012 | Saito | 358/1.15 |
| 2008/0055613 A1 * | 3/2008 | Hatfield | 358/1.2 |
| 2009/0285501 A1 * | 11/2009 | Hoshino | 382/260 |
| 2010/0079510 A1 * | 4/2010 | DiBiase et al. | 347/5 |
| 2011/0096344 A1 * | 4/2011 | Morovic et al. | 358/1.9 |
| 2011/0320497 A1 * | 12/2011 | Takase | 707/797 |
| 2012/0050781 A1 * | 3/2012 | Morita | 358/1.13 |
| 2012/0136965 A1 * | 5/2012 | Matz | 709/217 |
| 2013/0046771 A1 * | 2/2013 | Moitra et al. | 707/749 |
| 2013/0128314 A1 * | 5/2013 | Chopra et al. | 358/1.18 |
| 2013/0204867 A1 * | 8/2013 | Lim et al. | 707/723 |

OTHER PUBLICATIONS

Luo et al., "Web Article Extraction for Web Printing: a DOM+Visual based Approach", 2009, ACM, pp. 66-69.*

* cited by examiner

*Primary Examiner* — James J Debrow
(74) *Attorney, Agent, or Firm* — Lerner, David, Littenberg, Krumholz & Mentlik, LLP

(57) ABSTRACT

In one aspect, a method and apparatus is provided for reducing ink consumption when printing electronic documents. An electronic document is processed to identify different elements of the document, such as images, text blocks, and advertisements. Once the element identification is complete, a score is assigned to each one of the elements. The scores are then compared against a threshold T and only elements whose scores exceed the threshold T are printed. By filtering out some of the elements of the electronic document, the method and apparatus conserves ink and other printer consumables.

30 Claims, 10 Drawing Sheets

METHOD OF CONTENT FILTERING TO REDUCE INK CONSUMPTION ON PRINTED WEB PAGES

BACKGROUND

The cost of printing hard copies of electronic documents on paper may add up over time and result in a considerable expense to businesses and individuals. Printing costs depend on the usage of printer consumables, such as paper or ink. The more ink and paper that documents require, the more expensive it is to print those documents. In that regard, one way to lower printing costs is to reduce the amount of ink or paper used when documents are printed.

SUMMARY

According to one aspect, a method and apparatus is provided for reducing the amount of printer consumables used when electronic documents are printed. The method and apparatus filters out ancillary content such as advertisements and user interface components while retaining other content that is believed relevant to the user. By preventing irrelevant content from being printed, the method and apparatus conserves printing consumables and reduces costs associated with the printing of documents.

According to another aspect, a computer-implemented method is provided for processing a document for printing. The method includes receiving a representation of the document that specifies a first visual content item and a second visual content item and selecting a portion of the representation of the document that specifies, at least in part, the first visual content item. Once the portion is selected, a characteristic of the selected portion is determined, a score is assigned to the selected portion based on the determined characteristic, and a determination is made as to whether the score is within a predetermined range of scores. When the score is within the predetermined range, a filtered version of the document is generated by a processor that includes the first visual content item while omitting the second visual content item. The filtered version of the document is then sent to a printer for printing.

The document may be a web-page and the representation of the document may be markup language code. The filtered version of the document may be a PostScript file or a raster image of the document. The first visual content item and the second visual content item may include one or more of text or graphics. The selected portion may include hyperlinked text and/or plain text. The characteristic of the selected portion may be a ratio of a length of the hyperlinked text and a length of the plain text.

In some instances, the score may be assigned based on the ratio of the length of the hyperlinked text to the length of the plain text. In other instances, the score may be assigned based on a value of a markup language attribute that is part of the selected portion of the representation of the document. In yet other instances, the score may be assigned based on a name of a markup language tag that is part of the selected portion of the representation of the document. In yet other instances, the score may be assigned based on a dimension of the first visual content item.

According to yet another aspect, a system is provided for managing the printing of web page content. The system comprises a memory, a display device, and a processor coupled to the memory and display device. The memory stores an indication of a range of score values. The display device is configured to present a graphical user interface (GUI) for either narrowing or expanding the indication of the range of score values. The processor is configured to obtain a representation of the document, the representation specifying a first visual content item and a second visual content item. The processor is further configured to identify a first portion of the representation specifying at least in part the first visual content item, identify a second portion of the representation specifying at least in part the second visual content item, and assign a first score to the first portion and a second score to the second portion, such that both the first score and the second score are located within the range. The processor is further configured to generate a first filtered version of the document, the first filtered version including both the first visual content item and the second visual content item and output via the display device a first image of the first filtered version of the document. The processor is further configured to receive, via the GUI, a user input, the user input narrowing the range such that the second score that is assigned to the second visual content item is no longer located within the range and generate a second filtered version of the document. The second filtered version of the document includes only visual content items having assigned scores that are located within the narrowed range specified by the user input and thus the second filtered version of the document does not include the second visual content item. The processor is further configured to replace the first image with a second image, the second image depicting the second filtered version of the document.

The first visual content item and the second visual content item may include at least one of text or graphics. The representation of the document may be one of an HTML file, a post script file, or a word document. The second filtered version of the document may be one of a postscript file, a raster image, or an HTML file. The range may be defined at least in part by a threshold T, and the GUI may include an input component or a text field for changing the value of the threshold T. In some instances, the range may include only one of all scores that are greater than the threshold T, and all scores that are less than the threshold T.

The processor may further be configured to determine a first characteristic of the first portion of the document and a second characteristic of the second portion of the document. The first score may be assigned to the first portion based on the first characteristic and the second score may be assigned to the second portion based on the second characteristic.

According to yet another aspect, a computer-implemented method is provided for managing the printing of a document. The method includes outputting for presentation to a user, via a display device, a graphical user interface (GUI) for specifying a range of score values and receiving, via the GUI, user input specifying the range. The method further includes receiving a mark-up language representation of the document that specifies a first visual content item and a second visual content item and selecting a portion of the representation of the document. The selected portion includes a markup language tag, and the selected portion specifies, at least in part, the first visual content item. Once the portion is selected, a score is assigned to it based on the name of the tag. Afterwards, a determination is made as to whether the score is located within the range and a filtered version of the document is generated. The filtered version of the document includes the first visual content item while leaving out the second visual content item, wherein the first visual content item is included in the filtered version of the document based on the score being within the range.

The first visual content item and the second visual content item may include one or more of text or graphics. The score may be assigned based on the value of a markup language attribute that is part of the portion of the representation of the document. The characteristic may include a dimension of a visual content item.

The document may be a web-page and the representation of the document may be markup language code. The selected portion of the document may include hyperlinked text and plain text. The characteristic of the selected portion may be a ratio of a length of the hyperlinked text and a length of the plain text. The score may be assigned to the first element based on the ratio of the length of the hyperlinked text to the length of the plain text.

According to yet another aspect, a printer is provided that comprises a processor. The processor is configured to receive a representation of a document, the representation of the document specifying a first visual content item and a second visual content item. The processor is further configured to select a portion of the representation of the document, determine a characteristic of the selected portion, assign a score to the selected portion based on the determined characteristic, and determine whether the score is within a predetermined range of score values. The selected portion specifies, at least in part, the first visual content item. When the score is within the predetermined range, processor may be configured to generate and print a filtered version of the document that includes the first visual content item while omitting the second visual content item.

The first visual content item and the second visual content item may include one or more of text or graphics. The document may be a web-page and the representation of the document may be markup language code. The selected portion may include hyperlinked text and plain text. The characteristic of the selected portion may be a ratio of a length of the hyperlinked text and a length of the plain text. In some instances, the score may be assigned based on a ratio of the length of the hyperlinked text to the length of the plain text. In other instances, the score may be assigned based on a value of a markup language attribute that is part of the selected portion of the representation of the document. In yet other instances, the score may be assigned based on a dimension of the visual content item.

According to yet another aspect, a system is provided that includes a computing device coupled to a printer. The computing device is configured to receive a representation of the document that specifies a first visual content item and a second visual content item. The computing device is further configured to select a portion of the representation of the document that specifies, at least in part, the first visual content item, determine a characteristic of the selected portion, assign a score to the selected portion based on the determined characteristic, and determine whether the score is within a predetermined range of score values. When the score is within the predetermined range, the computing device may be configured to generate a filtered version of the document and send the filtered version to a printer for printing. The printer is configured to receive the filtered version of the document, and print a hard copy of the filtered version of the document. The filtered version of the document includes the first visual content item while omitting the second visual content item.

The first visual content item and the second visual content item may include one or more of text or graphics. In some instances, the score may be assigned based on a value of a markup language attribute that is part of the selected portion of the representation of the document. In other instances, the score is assigned based on a dimension of the first visual content item. In yet other instances, the score may be assigned based on a name of a markup language tag that is part of the selected portion of the representation of the document.

BRIEF DESCRIPTION OF THE DRAWINGS

FIG. 2 depicts a rendered version of a document.

FIG. 3 depicts a markup language representation of the document of FIG. 2.

DETAILED DESCRIPTION

According to one aspect, a method and apparatus are provided for reducing ink consumption when printing documents. An electronic representation of a document may be processed to identify different elements of the document, such as images, text blocks, and advertisements. Once the elements are identified, a score is assigned to each them. The scores are compared against a threshold T and only elements whose scores exceed the threshold T are printed.

According to another aspect, a GUI may be provided for setting the threshold T. The GUI may include a slider bar, checklist, or another input component. When the GUI includes a slider bar, moving the slider bar may result in the value of the threshold T being increased or decreased depending on the direction of movement. In some instances, a print preview image may be generated and updated as the threshold T is changed with the GUI. The print-preview image may enable the user to see what content is filtered out and what content remains printable after the threshold T is changed.

Figure 1:
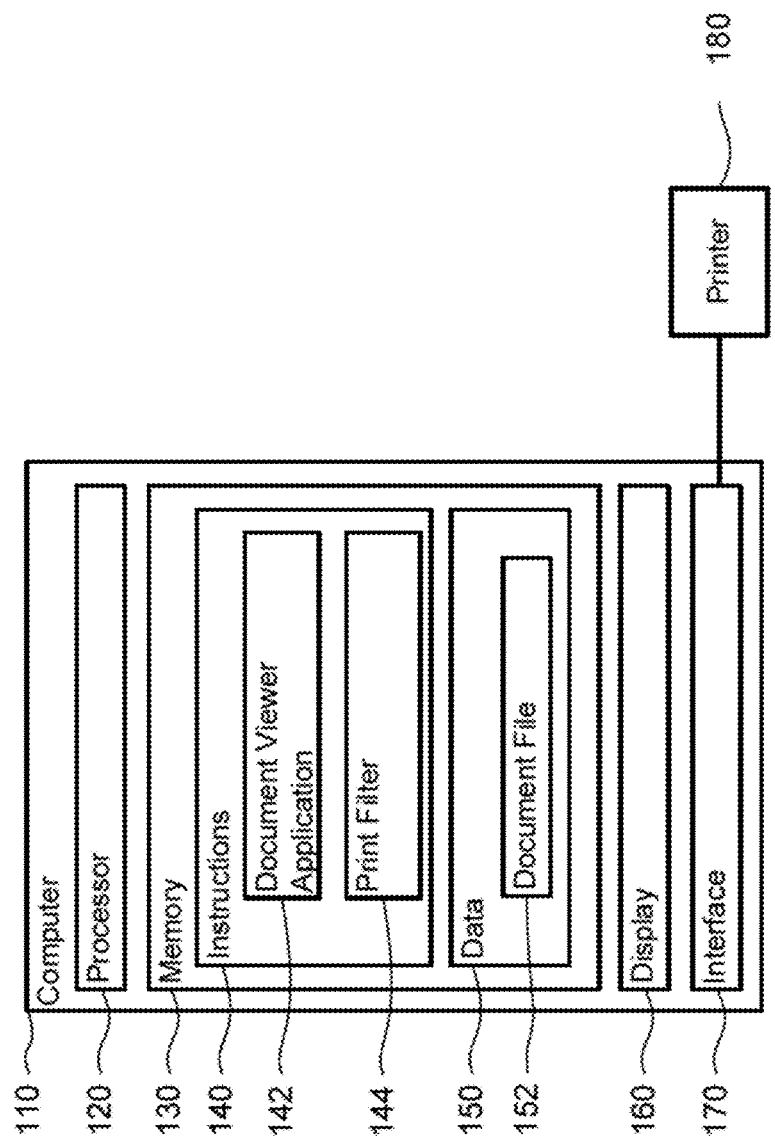
FIG. 1 depicts a schematic diagram of a system in accordance with aspects of the disclosure.

As shown in FIG. 1, an exemplary system 100 may include computing device 110 and printer 180. Computing device 110 may contain a processor 120, memory 130, display 160, interface 170, and other components typically present in general purpose computers. Computing device 110 may be a personal computer, server, mainframe, laptop, desktop, cell phone, or any other processor-based computing device.

Memory 130 of computing device 110 stores information accessible by processor 120, including instructions 140 that may be executed by the processor 120. The memory 130 also includes data 150 that may be retrieved, manipulated or stored by the processor. The memory 130 may be of any type capable of storing information accessible by the processor, such as a hard-drive, memory card, ROM, RAM, DVD, CD-ROM, write-capable, and read-only memories. The processor 120 may be any well-known processor, such as commercially available processors. Alternatively, the processor 120 may be a dedicated controller such as an ASIC.

The instructions 140 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Document viewer 142 may be a software application for rendering, editing, or printing electronic documents. The document viewer 142 may be a web browser, a word processor, a spreadsheet application, or an image viewer. In some aspects, the document viewer 142 may interpret and render markup language files or files, such as Postscript, HTML, DHTML, XML, and others. In other aspects, the document viewer 142 may execute scripts (or macros) and render output produced by the scripts. The scripts may include JavaScript, Basic, JAVA, or C scripts. In yet other aspects, the document viewer may be capable of displaying images (e.g., GIF, PNG), displaying flash media, video clips, and audio clips. In yet other aspects, the document viewer may be capable of displaying any file format that uses metadata to specify document layout. In the present example, the document viewer 142 is a web browser.

Print filter 144 may include processor executable instructions for reducing the use of printer consumables (e.g., ink, toner, paper) when printing electronic documents. The print filter 144 may be stand alone application or part of the document viewer 142, a printer driver, an operating system printing utility, printer firmware, software executed by the printer 180, or any other type of software. In operation, the print filter 144 may generate a filtered version of a document that excludes content, such as advertisements and other irrelevant content. In the present example, the print filter 144 operates in conjunction with the document viewer 142 to print a web page.

Data 150 may be retrieved, stored or modified by processor 120 in accordance with the instructions 140. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Document file 152 may be an electronic representation of a document. The document may specify visual content, such as text, graphics, or both. The visual content may be represented using ASCII characters (e.g., HTML tags, PostScript annotations, JavaScript instructions, and plain text), bit strings, or any other suitable format. The visual content may be rendered on a display 160 of the computing device 110, or alternatively, it may be rendered on paper by using the printer 180. Rendering of the visual content may involve producing a raster image of the document. Alternatively, rendering the visual content may involve translating the document file to another representation of the visual content, such as a post script file, an XPS file, a text file, and so forth. When the visual content is rendered, instructions, such as HTML tags, postscript annotations, JavaScript, Java or C++ commands may be executed. Such instructions may specify various properties of the visual content, such as text color, text location, text font, image location, and so forth.

In some aspects, the document file 152 may be a markup language representation of a document, such as a PDF, DOC, ODT, XLS, HTML, or XML file. In other aspects, the document file 152 may include source code written in programming languages, such as JavaScript or Java. In the present example, the document file 152 is an HTML file specifying a web page.

The display 160 may be a computer monitor or any other type of display device. Interface 170 may be a USB, Etherenet, WiFi, Serial, infrared or any other interface adapter capable of connecting the computing device 110 to the printer 180. The printer 180 may be an ink jet, laser jet, thermal printer, label maker, receipt printer, or any other type of printing device. In some instances, the printer 180 may include a processor, memory, and/or a display screen. Although in the present example the document viewer 142 and the print filter 144 are executed by the computing device 110, in other aspects, they may be executed by the printer 180, or executed in a shared fashion by both the printer 180 and the computing device 110.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

Figures 2, 3:
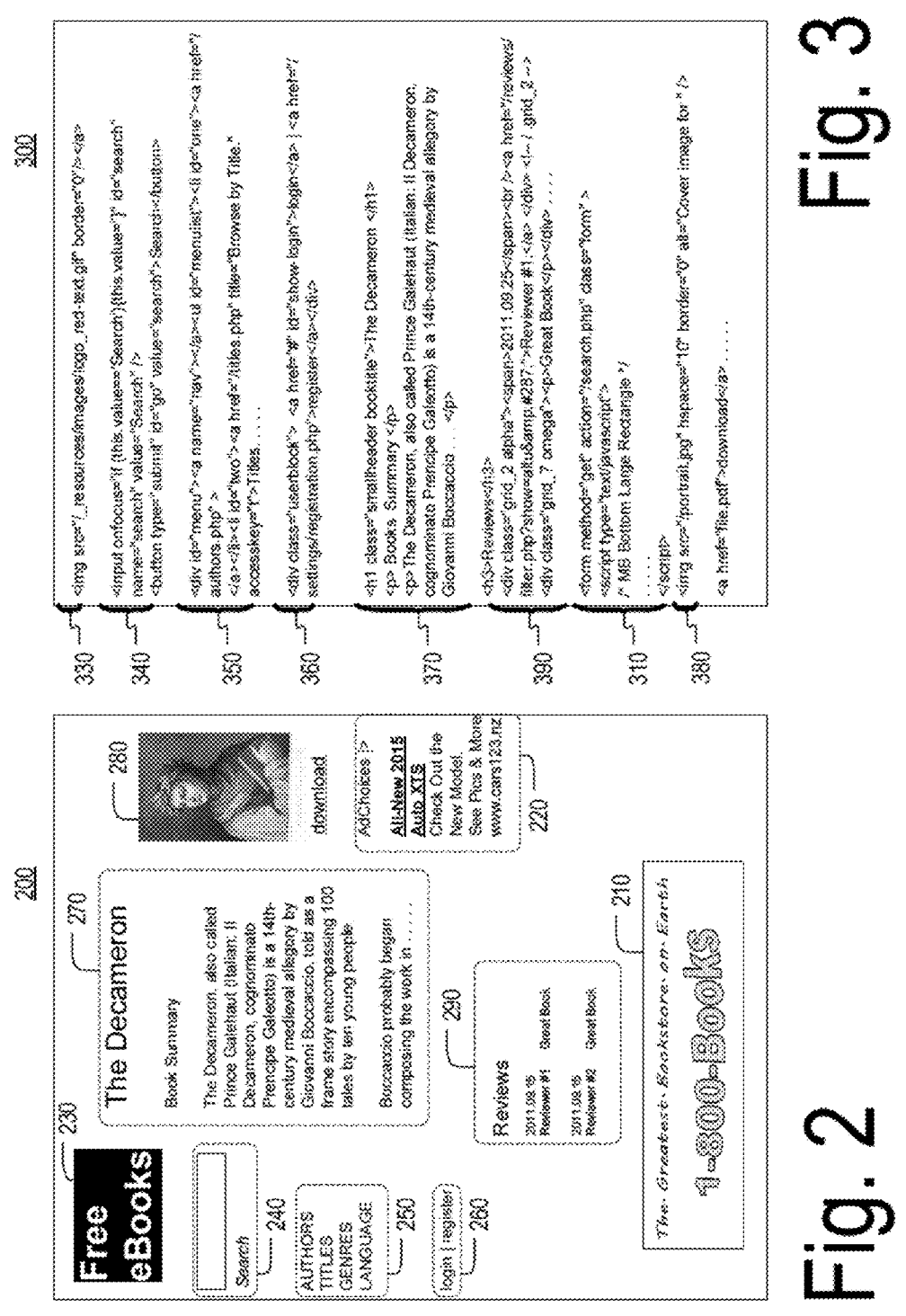

FIG. 2 depicts a rendition of a web page 200 that is specified by the document file 152. The web page 200 may include one or more visual content items 210-290. Each of the visual content items 210-290 may include text (e.g., a word, sentence, paragraph or text block of a document) or graphics (e.g., a picture, a table, a background image, a video frame). The visual content items 210-290 are examples of visual content items that may be specified by source code in the document file 152.

By way of example only, the visual content items 210 and 220 may be advertisements. The visual content item 230 may be an image a logo of the web page 200. The visual content items 240-260 may be part of the user interface of the web page 200. Specifically, the visual content item 240 may be a search bar having a text input field for inputting search queries and a search button for submitting the input search queries to a search engine. The visual content item 250 may be a navigation bar comprising a plurality of links for navigation between different web pages of a web site. The visual content item 260 may be a login bar having a "login" and "register" links for logging in or registering with the web page.

The visual content items 270-290 may include published content that is presented using the web page 200. The visual content item 250 may be a text block that is part of a book summary. The visual content item 270 may be an illustration intended to enhance the book summary. The visual content item 290 may include one or more user-generated reviews. In some aspects, published content, such as the visual content items 270-290, may be the reason for which users visit the web page 200. As will be readily appreciated, web site users are unlikely to visit web pages to look at the web pages' user interfaces or read advertising banners. Thus, when the web page 200 is printed on paper using the print filter 144 it might be acceptable, under some circumstances, to leave out advertisements and interface components from the paper copy in order to save on ink and other printer consumables.

FIG. 3 depicts an example 300 of source code that may be part of the document file 152. In this example, the file 152 is a markup language representation of the web page 200 and it includes source code which, when executed, results in the web page 200 being rendered. In this example, the file 152 includes code portions 310-380. Each of the code portions may include a line of the document file (e.g., source code, plain text, or both), a plurality of lines of the document file 152, or a portion of a line of the document file 152. In some aspects, one or more of the code portions 310-380 may include a markup language tag, such as an HTML tag. In other aspects, one or more of the code portions 310-380 may include a programming language instruction, such as a JavaScript, BASIC, or C++ instruction. In yet other aspects, one or more of the code portions may include plain text. Regardless of their content, each one of the code portions 310-380 may specify, at least in part, one of the visual content items 210-280.

The code portion 310 may include a SCRIPT HTML tag and one or more JavaScript instructions. When executed, the JavaScript instructions may result in the visual content item 210 being rendered. The code portion 330 may be an IMG HTML tag which when executed may result in the visual content item 230 being rendered. The code portion 340 may include an INPUT HTML tag which when executed may result in the visual content item 240 being rendered. The code portion 350 may include a MENU HTML tag which when executed may result in the visual content item 250 being rendered. The code portion 360 may include an HREF tag which when executed may result in the visual content item 260 being rendered. The code portion 370 may include a P HTML tag which when executed, may result in the element 270 being rendered. The code portion 380 may include an IMG HTML tag which when executed may result in the visual content item 280 being rendered. The element 390 may include DIV HTML tag which when executed may result in the user reviews 290 being rendered on the web page 200.

Figure 4:
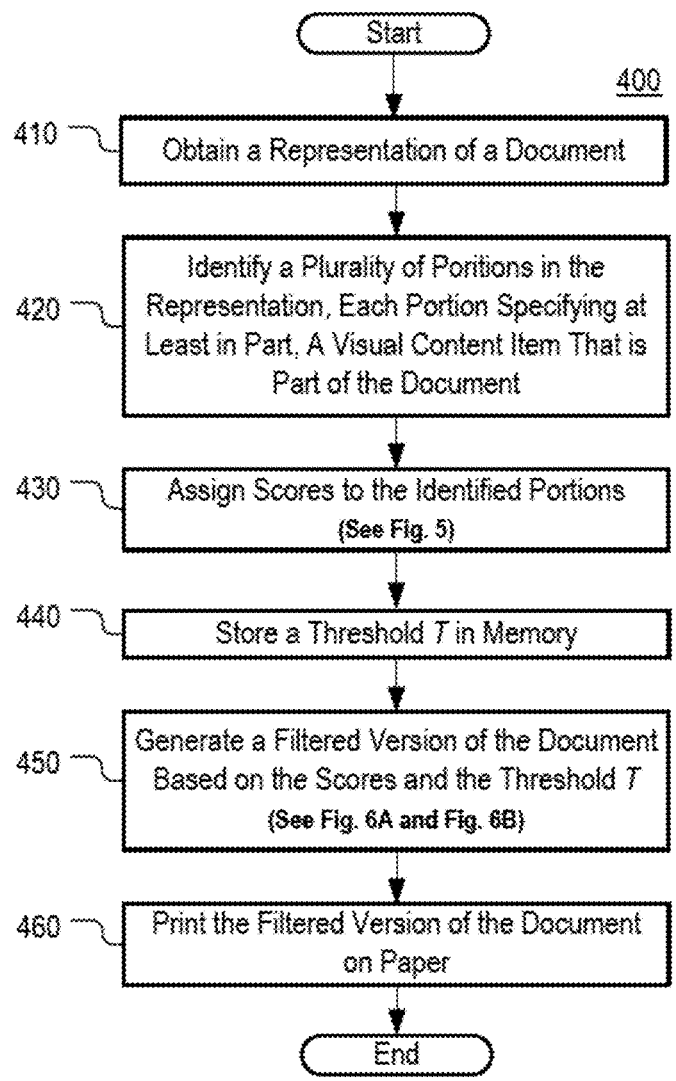
FIG. 4 depicts a flowchart of a process in accordance with aspects of the disclosure.

FIG. 4 depicts a flowchart of a print filter process 400 in accordance with aspects of the disclosure. At task 410, a representation of a document, e.g., the document file 152, is obtained. As discussed, the document file 152 contains a representation of the web page 200 (e.g., HTML code, Java Script code). At task 420, the document file 152 is processed to identify one or more portions of the web page representation. In the present example, code portions 310-380 are identified. At task 430, a score is assigned to each one of the code portions 310-380. The assigned scores may be character strings, numbers, or alphanumeric strings. At task 440, a threshold T is obtained. The threshold T may be a character string, a number, or an alphanumeric string. Threshold T may specify a range of scores. At task 450, some of the elements in the web page 200 are filtered out and a filtered version of the web page 200 is produced. The filtered version may include only visual content items specified, at least partially, by code portions whose assigned scores are within the range specified by the threshold T. At task 460, the filtered version of the web page 200 is sent to the printer 180 for printing. Because the filtered version of the web page 200 includes fewer than all visual content items, printing the filtered version of the web page 200 may require less ink than printing a rendition of the web page 200 that includes all visual content items specified by the document file 152.

Figure 5:
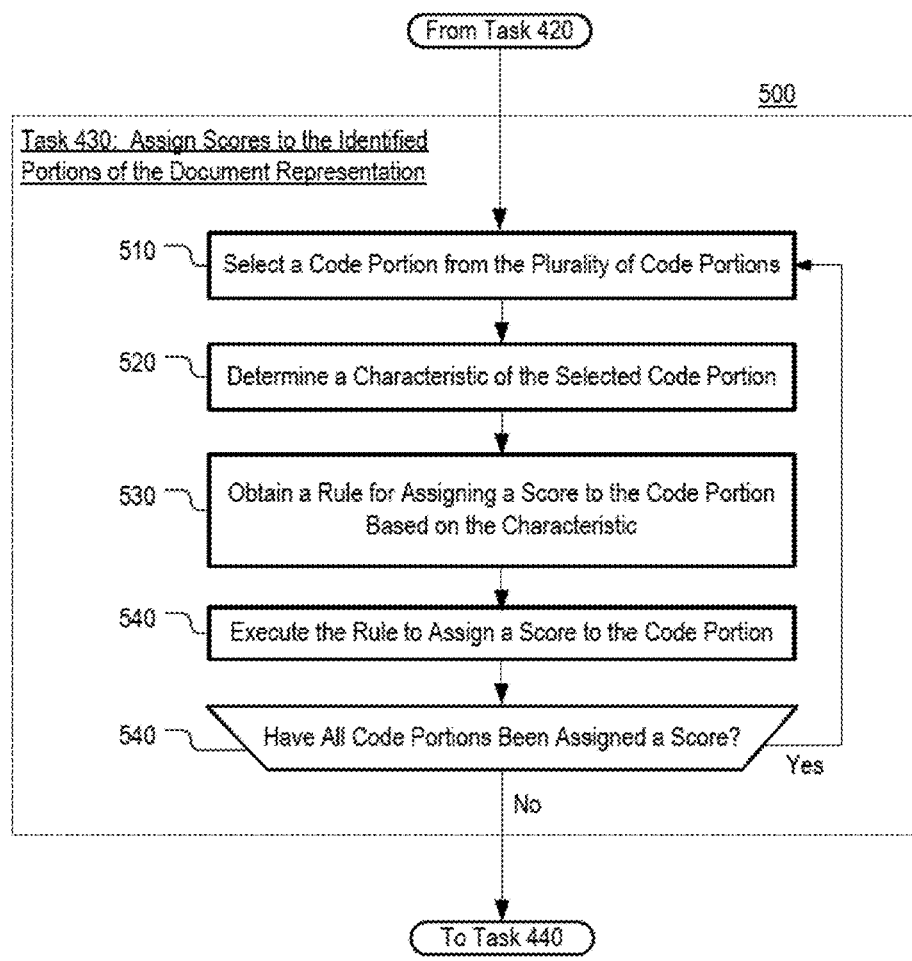
FIG. 5 depicts a flowchart of a sub-process associated with FIG. 4.

FIG. 5 depicts a flowchart of an example process 500 associated with assigning element scores as specified by task 430 of FIG. 4. At task 510, a code portion from the plurality of code portions 310-380 is selected. At task 520, a characteristic of the selected code portion is determined.

Examples of possible code portion characteristics may include

C1: Name of a markup language tag, such as an HTML tag, that is part of the of the selected code portion.
C2: Name of a programming language instruction, such as JavaScript instruction, that is part of the selected code portion.
C3: The value of markup language attribute that is part of the selected code portion.
C4: The value of a variable that is part of the selected code portion.
C5: A URL that is part of the selected code portion.
C6: Length of plain text that is part of the selected code portion. The string of "The Decameron, also called . . . " that is part of the code portion 370 is an example of plain text. Plain text may be any text that is displayed the user as a result of executing the source code in the document file 152.
C7: Length of hyperlinked text that is part the selected code portion. In one aspect, hyperlinked text may be any text which when rendered by the document viewer 142, is clickable by the user, such that clicking on hyperlinked text causes the document viewer 142 to open a document referenced by a hyperlink which the hyperlinked text is part of.
C8: Ratio of hyperlinked text to plain text in the selected code portion.

Furthermore, the code portion selected at task 510 may specify, at least in part, one of the visual content items 210-280. For example, the code portion 330 is said to specify the visual content item 230 because the code portion 330 results in the visual content item 230 being rendered in the web page 200 when the code portion 330 is executed. In some aspects, the characteristic of the code portion selected at task 510 may be based on attributes of the visual content item specified by the code portion. Examples of such characteristics include:

C9: Location, in the rendered web page, of the visual content item that is specified selected code portion (e.g., top of the page, bottom of the page, or middle of the page).
C10: Page where the visual content item specified by the selected code portion, is located (e.g., $1^{st}$ page, $5^{th}$ page) in a rendition of the document file 152.
C11: Dimensions of the visual content item specified by the selected code portion, (e.g., 50×50 pixels, 10×20 cm).
C12: Medium of content specified by the selected code portion (e.g., video, audio, still image)

At task 530, a rule for assigning a score to the code portion selected at task 510 is obtained, e.g., by retrieval from the memory 120. In some aspects, the rule may specify a formula or algorithm for calculating a score based on one or more of the characteristics C1-C11 determined at task 520. Exemplary rules for assigning a score to the element may include:

R1: Assign a score S1 to the code portion if the selected code portion includes the MENU HTML tag, or assign a score S2 to the code portion if the selected code portion includes a P HTML tag. The rule R1 is an example of a rule that depends on the name of an HTML tag that is part of the code portion identified at task 510.
R2: Assign a score S1 to the code portion if the JavaScript command alert is part of the code portion. The rule R2 is an example of a rule that depends on the name of a programming language instruction that is part of the code portion selected at task 510.

R3: Assign a score S1 to the code portion if the value of a shape attribute that is part of the code portion is equal to "poly" and assign a score S2 to the code portion if the value of the shape attribute is equal to "rect." The rule R2 is an example of a rule that depends on the value of an attribute that is part of the code portion selected at task 510.

R4: Lower the score of the code portion if a predetermined URL, such as "http://ad.source" is part of the code portion. The rationale for this rule may be that certain URLs are known to belong to online advertising services. The rule R4 is an example of a rule that is based on a URL that is part of the code portion identified at task 151.

R5: Increase the score of a code portion if the code portion includes more than 50 words of plain text. The rationale for this rule may be the advertisements and user interface components include only small snippets of text. Thus, in some circumstances, it might be possible to tell whether a given text is an advertisement or authored content based on the plain text's length.

R6: Assign a score S1 to the code portion if the ratio of hyperlinked text to plain text in the code portion exceeds a predetermined threshold.

R7: Assign a score S1 to the code portion if the visual content item specified by the code portion is located at the top of the web page 200, or assign a score S2 to the code portion if the visual content item is located towards the vertical middle of the web page 200. The rationale for this rule is that oftentimes advertisements are located towards the margins of web pages, whereas published content is closer to the center. The rule R7 is an example of a rule that is based on the location of the visual content item specified by the code portion selected at task 510.

R8: Assign a score S1 to the code portion if a dimension (or a combination of dimensions), such as length or width, of the visual content specified the code portion exceed a predetermined value.

R9: Assign a score S1 to the code portion based on added cost of printing the visual content item specified by the code portion. For example, if the last printed page of the document file 152 includes only a single line of text, it may be advantageous to remove that line in order to save a whole sheet of paper. The added cost may be measured in units of size of a visual content item (e.g., characters, pixels, centimeters) per unit of extra printer consumables (e.g., paper) that are going to be saved if a rendition of the code portion is not printed. In some aspects, when the added cost of the element is high, it may be advantageous to assign a low score to that element in order to prevent it from being printed.

R10: Assign a score S1 if the content item specified by the code portion is a still picture, assign a score S2, if the content item specified by the code portion is video clip, or assign a score S3, if the content item specified by the code portion is an audio file. The rationale for this rule is that oftentimes rendered documents include placeholders for non-printable media, such as video and sound, that need not be present in the printed version of the documents. The rule R10 is an example of a rule that is based on the medium of content item specified by the code portion.

At task 540, the rule obtained at task 530 is executed and a score for the element identified at task 510 is determined. In some aspects the score may be stored in a table that relates code portion identifiers to scores that have been assigned to those elements. At task 550, it is determined whether scores have been assigned to all elements in the plurality of code portions 310-380. If not, task 510 is executed again and another element is selected. Otherwise, task 440 is executed.

Figure 6B:
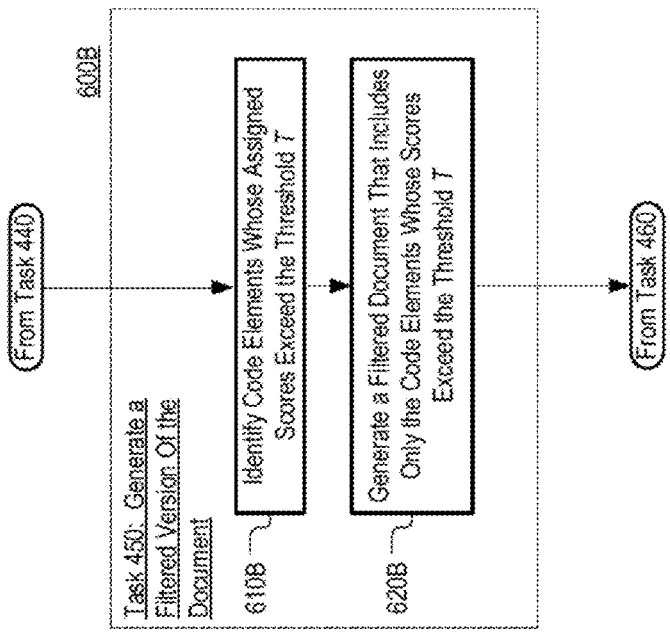
FIG. 6B depicts a flowchart of yet another sub-process associated with FIG. 4.
Figure 6A:
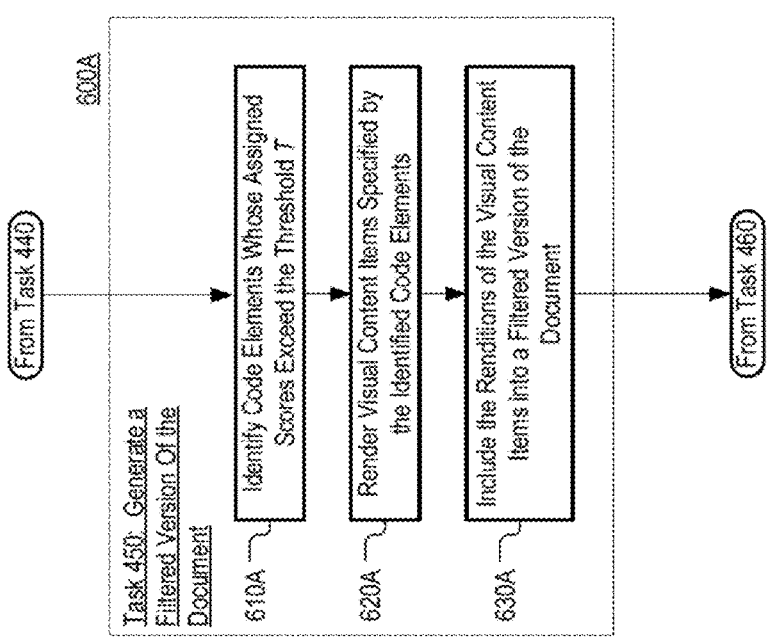
FIG. 6A depicts a flowchart of another sub-process associated with FIG. 4.

FIG. 6A depicts a flow chart of a process 600A associated with generating a filtered version of the web page 200 as specified by task 450 of FIG. 4. At task 610A, the scores assigned to the elements 310-380 are examined and a set C of code portions whose scores exceed the threshold T are identified. In one example, the set C may include some but not all of the code portions 310-380.

At task 620A, each element in the code C is rendered to produce a rendition of that code portion. The rendition may be a representation of a visual content item specified, at least in part, by the code portion. For example, rendering the code portion 370 may result in a raster image (or part thereof) being produced (e.g., bitmap of the visual content item 270). Alternatively, rendering the code portion 370 may result in a postscript representation of the code portion 370 being produced. For example, it may involve generating postscript instructions (e.g., annotations) that would retain the text format settings (e.g., font, location, color) specified by the code portion 370. As discussed above, rendering the code portions may involve executing programming language instructions, such as HTML tags and JavaScript instructions that are part of the code portions.

At task 630A, a filtered document is created including the rendered representations of the code portions in the set C that are generated at task 620A. The filtered document may be a post script file, an XPS size, a raster image (e.g., bitmap), or any other type of document representation. In one aspect, the filtered document may include some of the visual content items 210-290 while excluding others. As indicated above, the filtered document may exclude advertisements and user interface components.

FIG. 6B depicts a flow chart of a process 600B associated with generating a filtered version of the web page 200 as specified by task 450 of FIG. 4. At task 610B, the scores assigned to the elements 310-380 are examined and elements whose scores exceed the threshold T are identified. At task 620B, a filtered document may be generated that only elements whose scores exceed the threshold T while leaving out elements whose scores are below the threshold T. The filtered document may be in the same format as the document file 152. In one aspect, the filtered document may be generated by making a copy of the file 152 and deleting all elements that have scores that are less than the threshold T.

Figure 7:
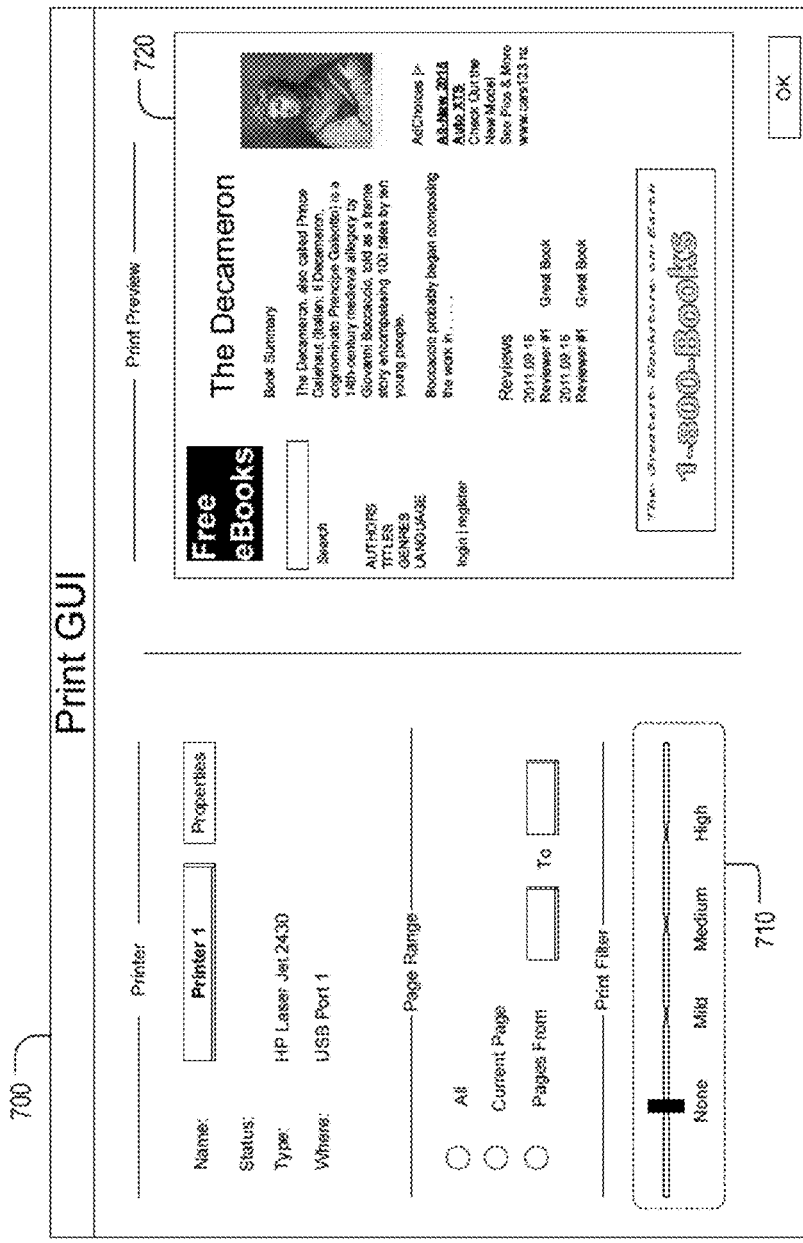
FIG. 7 depicts a schematic diagram of a graphical user interface (GUI) in accordance with aspects of the disclosure.

FIG. 7 depicts a schematic diagram of a GUI 700 of print filter 144 in accordance with aspects of the disclosure. GUI 700 may be a print menu which is displayed to the user by the computing device 110 when the user requests the web page 200 to be printed. The GUI 700 may allow the user to select a printer, or set a range of pages to be printed. Moreover, in this example, the GUI 700 may include an input component 710 and print preview image 720.

Input component 710 may be a slider bar having, by way of example only, four (4) possible positions respectively labeled "none", "low", "medium", and "high." The positions correspond to threshold values T1, T2, T3, and T4, respectively wherein T1<T2<T3<T4. When, the slider is at position "none" the threshold T is set to equal the value T1, when the slider is at position "low" the value of the threshold T is set to equal T2, when the slider is at position "medium" the threshold T is set to equal the value T3, and when the slider is at position "high", the threshold T4 is set to equal the value T4. Changing the position of the slider either increases or decreases the value of the threshold T depending on the direction in which the slider is moved.

The print-preview image 720 is an image showing the layout of content specified by the document file 152. Specifically, the print-preview image 720 depicts what a paper copy of the web page 200 would like if the web page 200 were to be printed when the slider 710 is at the "none" position. In this example, the print-preview image illustrates that no filtering is applied to the document file 152 when the slider 710 is set at the "none" position and that all visual content items specified by the document file 152 would be printed.

Figure 8:
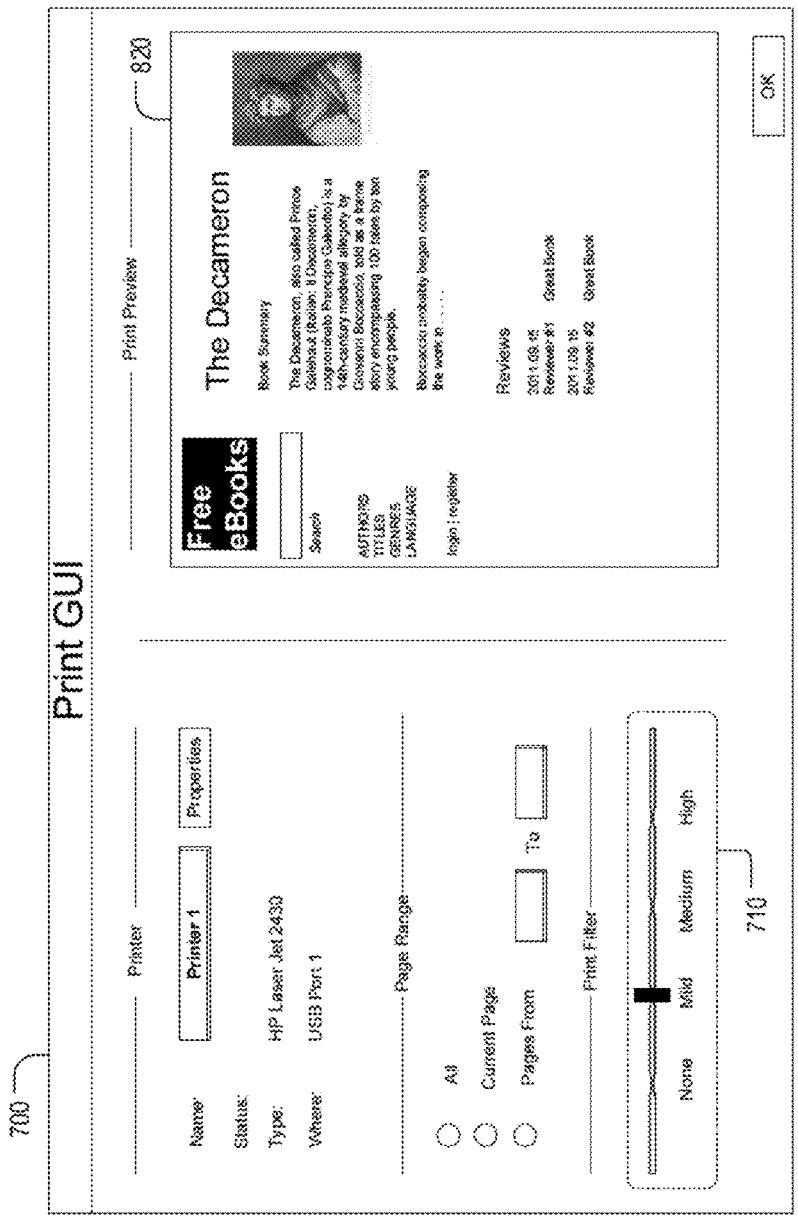
FIG. 8 depicts another schematic diagram of the GUI of FIG. 7.

FIG. 8 depicts a schematic diagram of the GUI 700 when the slider 710 is set at the "low" position. When the slider is at the "low" position, the threshold T is set to equal the value T2 and only light filtering is applied to the document file 152. The print-preview image 820 may depict the layout and content of the filtered document generated at task 450 when the threshold T equals the value T2. Specifically, in this example, the print preview image 820 illustrates that moving the slider to "low" may result in the visual content items 210 and 220 being left out of the filtered version of the web page 200 that would be printed if a user chooses to finalize the printing process and press the "OK" button.

Figure 9:
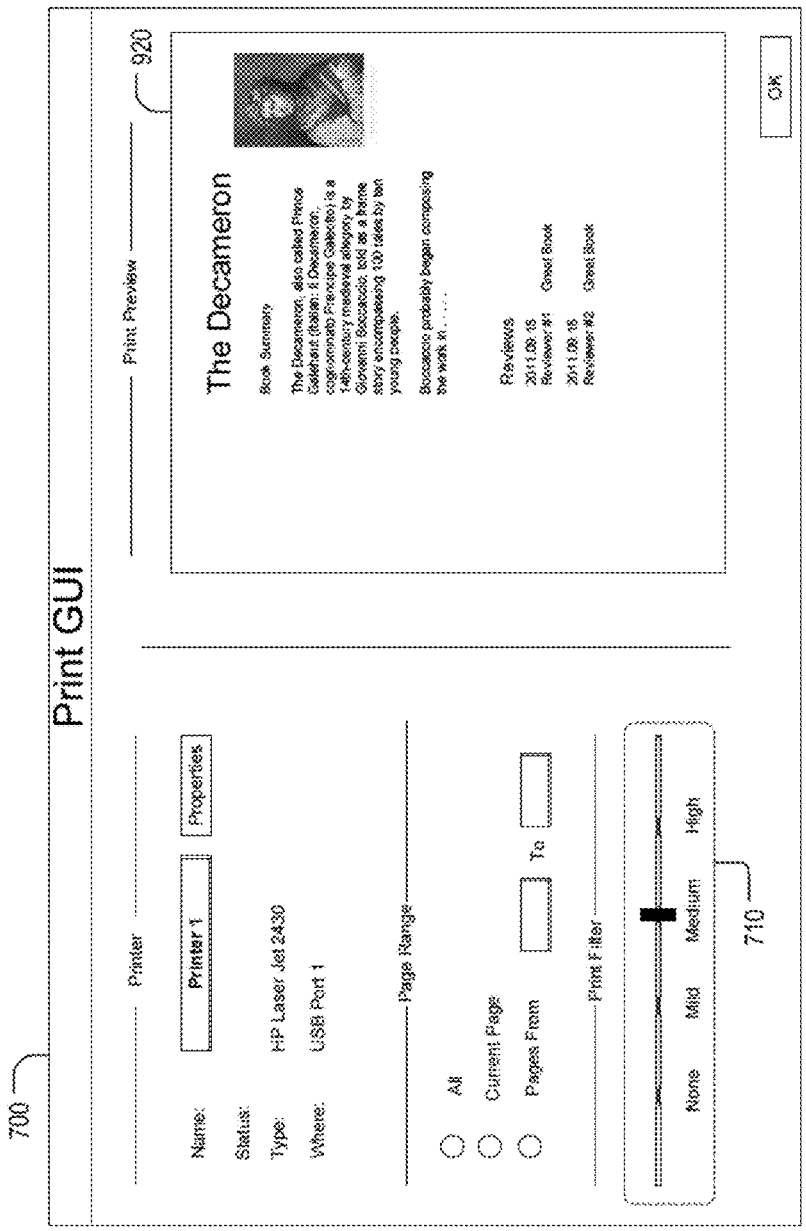
FIG. 9 depicts a yet another schematic diagram of the GUI of FIG. 7.

FIG. 9 depicts a schematic diagram of the GUI 700 when the slider 710 is set at the "medium" position. When the slider is at the "medium" position, the threshold T is set to equal the value T3 and a medium amount filtering is applied to the document file 152. The print preview image 920 shows an updated version of the filtered document that is generated when the value of the threshold T is changed to T3. The print preview image 920 illustrates that moving the slider to "medium" may result in the visual content items 210-260 being left out from the filtered version of the web page 200.

Figure 10:
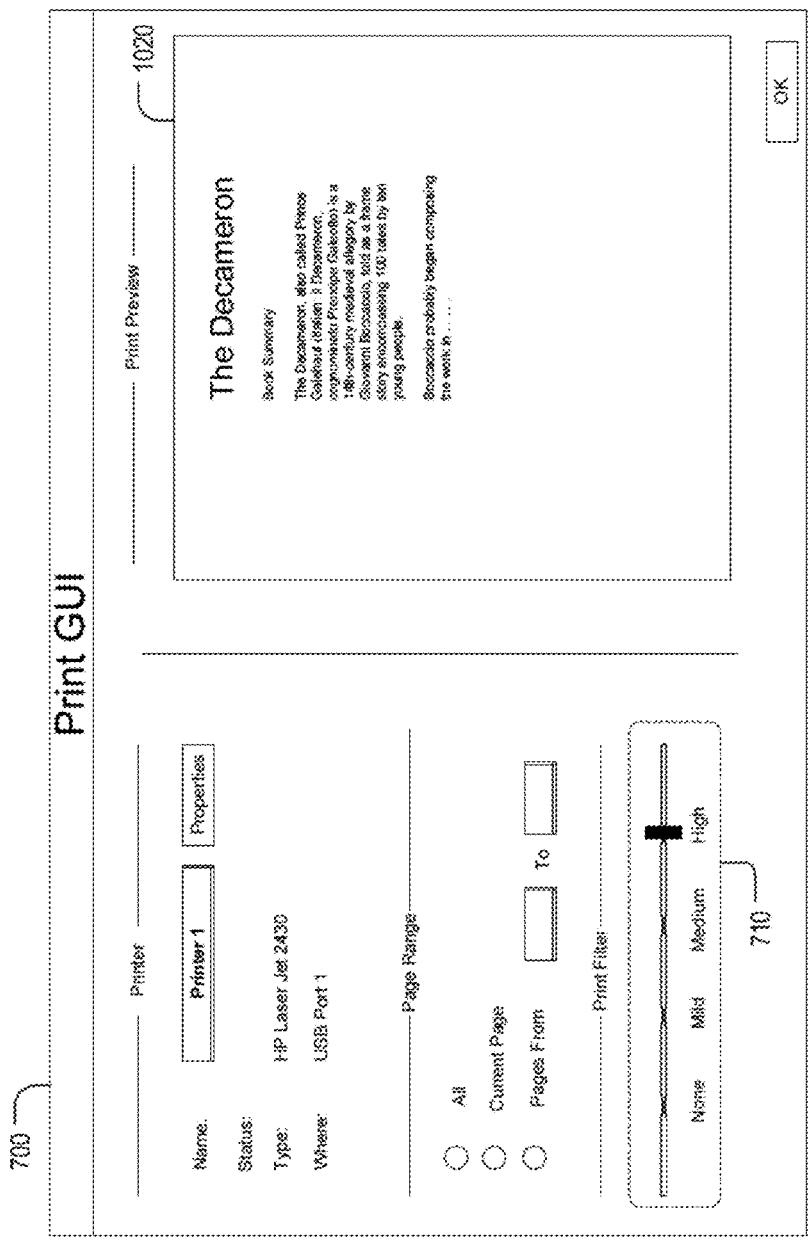
FIG. 10 depicts a yet another schematic diagram of the GUI of FIG. 7.

FIG. 10 depicts a schematic diagram of the GUI 700 when the slider 710 is set at the "high" position. When the slider is at the "high" position, the threshold T is set to equal the value T4 and heavy filtering is applied to the document 152. The print preview image 1020 shows an updated version of the filtered document that is generated when the threshold T is changed. In this example, the print preview image 920 illustrates that setting the print filter 154 to "high" may in the visual content items 210-260 and 280-290 being left out from the filtered version of the web page 200.

Figure 11:
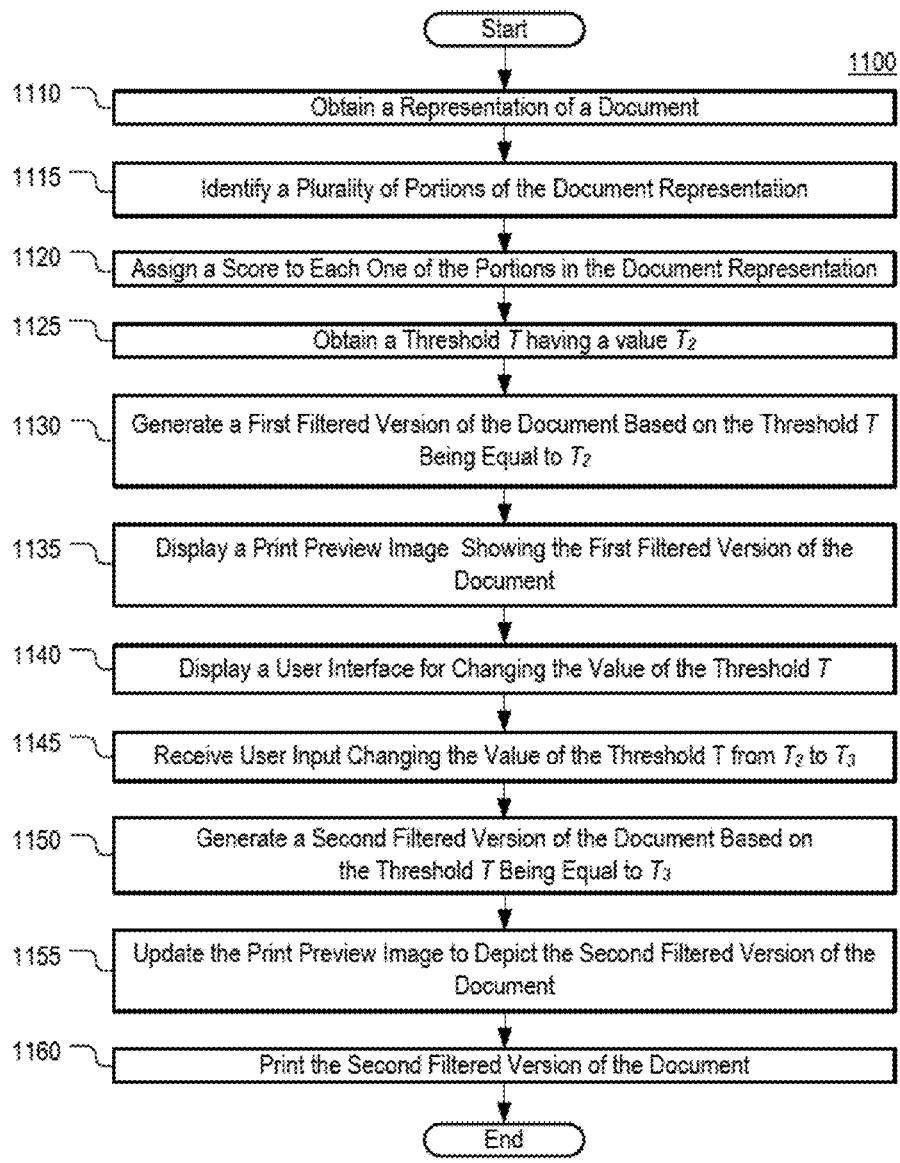
FIG. 11 depicts a flowchart of another process in accordance with aspects of the disclosure.

FIG. 11 depicts a flowchart of a process 1100 in accordance with another aspect of the disclosure. At task 1110, a representation of the web page 200 is obtained. In this example, the document file 152 is obtained. At task 1115, the source code in the document file 152 is processed to identify one or more code portions in it. At task 1120, a score is assigned to each of the identified code portions. At task 1125, a threshold T is obtained. The obtained threshold T is equal to T2. At task 1130, a first filtered version of the web page 200 is produced based on the scores assigned to the different code portions at task 1120. At task 1135, a print preview image of the first filtered document is output on the display screen 160 of the computing device 110. In the present example, the print-preview image 820 is output. The print preview image 820 illustrates the content and layout of the first filtered image.

At task 1140, a graphical user interface (GUI) for changing the value of the threshold T, such as the input component 710 (or a window containing the input component 710), is output on the display 160. At task 1145, user input is received changing the value of the threshold T from T2 to T3. The user input may be received via the GUI displayed at task 150. At task 1145, a second filtered version of the web page 200 is generated based on the updated value of the threshold T. At task 1155, the print preview image is updated to show the second filtered image. In the present example, the print preview image 920 is displayed. The print preview image 920 illustrates the content and layout of the second filtered image. At task 1160, the second filtered version of the web page 200 is sent to the printer 180 for printing a hard copy. In some aspects, printing the second filtered version may entail transmitting a copy of the second filtered version of the web page 200 to the printer 180.

FIGS. 4-6B and 11 are provided as examples. At least some of the tasks associated with FIGS. 4-6 and 11 may be performed in a different order than represented, performed concurrently, or altogether omitted. The process discussed with respect to FIGS. 4-6 and 11 may be implemented in software, as part of the instructions executed by a processor in hardware, or both in hardware and software. The processes may be performed by the computing device 100, the printer 180, or both the printer and the computing device. Furthermore, it should be noted that the filtered version of the document 152 produced at task 450 may have any type or format for as long as, the filtered version specifies (or indicates) fewer than all of the visual content items specified (or indicated) by the document file 152. A visual content item may be any object (e.g., text, picture, table) capable of being seen by a user when displayed on a computer screen or printed.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will be understood that the words "interpreted" and "executed" are used interchangeably herein and they have the same meaning. Furthermore, it will be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A computer-implemented method for processing a document for printing, the method comprising:
    receiving a representation of the document, the representation of the document specifying at least a first visual content item and a second visual content item of the document;
    selecting a portion of the representation of the document, the selected portion specifying, at least in part, the first visual content item;
    determining, by a processor, a characteristic of the selected portion;
    assigning a score to the selected portion, based on the determined characteristic;
    receiving user input selecting one of a plurality of ranges of score values, each of the plurality of ranges of score values corresponding to an amount of content from the document to be printed;
    determining whether the score is within the selected range of score values;
    when the score is within the selected range, generating by the processor a filtered version of the document that includes the first visual content item, the filtered version of the document omitting the second visual content item; and
    sending the filtered version of the document to a printer for printing;
    wherein the first visual content item and the second visual content item include one or more of text or graphics.

2. The computer-implemented method of claim 1, wherein the document is a web-page and the representation of the document is markup language code.

3. The computer-implemented method of claim 1, wherein the filtered version of the document is a PostScript file.

4. The computer-implemented method of claim 1, wherein the filtered version of the document is a raster image of the document.

5. The computer-implemented method of claim 1, wherein:
the selected portion includes hyperlinked text and plain text,
the characteristic of the selected portion is a ratio of a length of the hyperlinked text and a length of the plain text, and
the score is assigned based on the ratio of the length of the hyperlinked text to the length of the plain text.

6. The computer-implemented method of claim 1, wherein the score is assigned based on a value of a markup language attribute that is part of the selected portion of the representation of the document.

7. The computer-implemented method of claim 1, wherein determining the characteristic comprises identifying a dimension of the first visual content item, and the score is assigned based on the determined dimension.

8. The computer-implemented method of claim 1, wherein the score is assigned based on a name of a markup language tag that is part of the selected portion of the representation of the document.

9. A system for managing printing of web page content, the system comprising:
a memory for storing an indication of a range of score values corresponding to an amount of content from the web page to be printed;
a display device for presenting a graphical user interface (GUI) for either narrowing or expanding the indication of the range of score values; and
a processor coupled to the display device and the memory, the processor being configured to:
obtain a representation of the document, the representation specifying at least a first visual content item and a second visual content item;
identify a first portion of the representation specifying at least in part the first visual content item;
identify a second portion of the representation specifying at least in part the second visual content item;
assign a first score to the first portion and a second score to the second portion, such that both the first score and the second score are located within the range;
generate a first filtered version of the document, the first filtered version including both the first visual content item and the second visual content item;
output via the display device a first image of the first filtered version of the document;
receive, via the GUI, a user input, the user input narrowing the range such that the second score that is assigned to the second visual content item is no longer located within the range; and
generate, in response to the user input, a second filtered version of the document, the second filtered version of the document including only visual content items having assigned scores that are located within the narrowed range specified by the user input, wherein the second filtered version of the document does not include the second visual content item; and
replace the first image with a second image, the second image depicting the second filtered version of the document;
wherein the first visual content item and the second visual content item include at least one of text or graphics.

10. The system of claim 9, wherein the processor is further configured to:
determine a first characteristic of the first portion of the document;
determine a second characteristic of the second portion of the document;
wherein the first score is assigned to the first portion of the document based on the first characteristic; and
wherein the second score is assigned to the second portion of the document based on the second characteristic.

11. The system of claim 9, wherein:
the range is defined at least in part by a threshold T, and
the GUI includes an input component for changing the value of a threshold T.

12. The system of claim 9, wherein:
the range is defined at least in part by a threshold T, and
the GUI includes a text input field for changing the value of a threshold T.

13. The system of claim 9, wherein:
the processor is configured to store in the memory a threshold number T, and
the range includes only one of:
(i) all scores that are greater than the threshold T, and
(ii) all scores that are less than the threshold T.

14. The system of claim 9, wherein the representation of the document is one of an HTML file, a post script file, or a word document.

15. The system of claim 9, wherein the second filtered version of the document is one of a postscript file, a raster image, or an HTML file.

16. A computer-implemented method for managing printing of a document, the method comprising:
outputting for presentation to a user, via a display device, a graphical user interface (GUI) for specifying a range of score values corresponding to an amount of content from the document to be printed;
receiving, via the GUI, user input specifying the range;
receiving a mark-up language representation of the document, the mark-up language representation of the document specifying a first visual content item and a second visual content item;
selecting a portion of the representation of the document, wherein:
(i) the selected portion includes a markup language tag, and
(ii) the selected portion specifies, at least in part, the first visual content item;
assigning a score to the portion, the score being assigned based on the name of the tag;
determining whether the score is located within the range; and
generating, by a processor, a filtered version of the document that includes the first visual content item while leaving out the second visual content item, wherein the first visual content item is included in the filtered version of the document based on the score being within the range;
wherein the first visual content item and the second visual content item include one or more of text or graphics.

17. The computer-implemented method of claim 16, wherein the document is a web-page and the representation of the document is markup language code.

18. The computer-implemented method of claim 16, wherein:
the portion includes hyperlinked text and plain text, the characteristic of the selected portion is a ratio of a length of the hyperlinked text and a length of the plain text, and the score is assigned to the first element based on the ratio of the length of the hyperlinked text to the length of the plain text.

19. The computer-implemented method of claim 16, wherein the score is assigned based on the value of a markup language attribute that is part of the portion of the representation of the document.

20. The computer-implemented method of claim 16, wherein determining the characteristic comprises identifying a dimension of the first visual content item.

21. A printer comprising a processor, the processor being configured to:
   receive a representation of a document, the representation of the document specifying a first visual content item and a second visual content item of the document;
   select a portion of the representation of the document, the selected portion specifying, at least in part, the first visual content item;
   determine a characteristic of the selected portion;
   assign a score to the selected portion, based on the determined characteristic;
   receive user input selecting one of a plurality of ranges of score values, each of the plurality of ranges of score values corresponding to an amount of content from the document to be printed;
   determine whether the score is within the selected range of score values;
   when the score is within the selected range, generate a filtered version of the document that includes the first visual content item, the filtered version of the document omitting the second visual content item; and
   print the filtered version of the document;
   wherein the first visual content item and the second visual content item include one or more of text or graphics.

22. The printer of claim 21, wherein:
   the selected portion includes hyperlinked text and plain text,
   the characteristic of the selected portion is a ratio of a length of the hyperlinked text and a length of the plain text, and
   the score is assigned based on a ratio of the length of the hyperlinked text to the length of the plain text.

23. The printer of claim 21, wherein the score is assigned based on a value of a markup language attribute that is part of the selected portion of the representation of the document.

24. The printer of claim 21, wherein determining the characteristic comprises identifying a dimension of the first visual content item, and the score is assigned based on the determined dimension.

25. The printer of claim 21, wherein the document is a web-page and the representation of the document is markup language code.

26. A system comprising a computing device connected to a printer, wherein:
   the computing device is configured to:
      receive a representation of the document, the representation of the document specifying a first visual content item and a second visual content item of the document;
      select a portion of the representation of the document, the selected portion specifying, at least in part, the first visual content item;
      determine a characteristic of the selected portion;
      assign a score to the selected portion, based on the determined characteristic;
      receive user input selecting one of a plurality of ranges of score values, each of the plurality of ranges of score values corresponding to an amount of content from the document to be printed;
      determine whether the score is within the selected range of score values;
      when the score is within the selected range, generate a filtered version of the document that includes the first visual content item, the filtered version of the document omitting the second visual content item; and
      send the filtered version of the document to a printer for printing; and
   the printer is configured to:
   receive the filtered version of the document, and
   print a hard copy of the filtered version of the document.

27. The system of claim 26, wherein the first visual content item and the second visual content item include one or more of text or graphics.

28. The system of claim 26, wherein the score is assigned based on a value of a markup language attribute that is part of the representation of the document.

29. The system of claim 26, wherein determining the characteristic comprises identifying a dimension of the first visual content item, and the score is assigned based on the determined dimension.

30. The system of claim 26, wherein the score is assigned based on a name of a markup language tag that is part of the selected portion of the representation of the document.

* * * * *